(12) United States Patent
Tang

(10) Patent No.: US 6,195,332 B1
(45) Date of Patent: Feb. 27, 2001

(54) RATE-BASED FLOW CONTROL PROTOCOL ON AN ETHERNET-OVER-RING COMMUNICATIONS NETWORK

(75) Inventor: Wen-Tsung Tang, Santa Clara, CA (US)

(73) Assignee: 3COM Corporation, Santa Clara, CA (US)

( * ) Notice: Subject to any disclaimer, the term of this patent is extended or adjusted under 35 U.S.C. 154(b) by 0 days.

(21) Appl. No.: 09/143,036

(22) Filed: Aug. 28, 1998

(51) Int. Cl.[7] .................................. H04J 1/16; H04J 3/16
(52) U.S. Cl. ............................................. 370/232; 370/468
(58) Field of Search ..................................... 370/452, 403, 370/462, 402, 222, 229, 230, 231, 233, 232, 235, 236, 237, 258, 450, 465, 468, 473; 395/800; 709/236

(56) References Cited

U.S. PATENT DOCUMENTS

| | | | |
|---|---|---|---|
| 5,117,419 | * 5/1992 | Konishi et al. | 370/403 |
| 5,426,640 | * 6/1995 | Hluchyj et al. | 370/235 |
| 5,471,472 | * 11/1995 | McClure et al. | 370/402 |
| 5,475,685 | * 12/1995 | Garris et al. | 370/235 |
| 5,541,922 | * 7/1996 | Pyhalammi | 370/462 |
| 5,560,038 | * 9/1996 | Haddock | 709/236 |
| 5,563,876 | * 10/1996 | Duxbury et al. | 370/402 |
| 5,566,178 | * 10/1996 | Butter et al. | 370/452 |
| 5,892,754 | * 4/1999 | Kompella et al. | 370/236 |
| 5,936,940 | * 8/1999 | Marin et al. | 370/232 |

* cited by examiner

Primary Examiner—Chau Nguyen
Assistant Examiner—Chiho Andrew Lee
(74) Attorney, Agent, or Firm—Wagner Murabito & Hao LLP

(57) ABSTRACT

A method for rate-based flow control protocol on a ring topology network utilizing ethernet packet format and ethernet equipment. The method operates on a communication network communicatively coupling a plurality of network nodes each representing a local area network (LAN). The method for controlling a transmission of a data packets on the ring-topology communication network uses the following steps. A flow path is determined for data packets in the communication network. In another step, limits are calculated for the flow paths of the data packets with respect to each of the network nodes such that the data packets have controlled access to transmit on the communication network. In a final step, the transmission of the data packets on the flow paths is controlled according to the limits and using a packet format and equipment that is directly compatible with the local area network.

14 Claims, 10 Drawing Sheets

RATE-BASED FLOW CONTROL PROTOCOL ON AN ETHERNET-OVER-RING COMMUNICATIONS NETWORK

TECHNICAL FIELD

The present claimed invention relates to the field of computer network communications. More specifically, the present claimed invention relates to a method and apparatus for transmitting packet-based data via ethernet hardware over a ring topology using rate-based controls.

BACKGROUND ART

Data communication is the process by which two or more data terminals or peripherals send information to each other. In its simplest form, a data communication system, or network, is comprised of a transmitter, a transmission path, and a receiver.

Networks are classified according to different characteristics. One such characteristic is its size. A local area networks (LAN) typically connects devices within a building or a school campus while a wide-area network (WAN) interconnects devices within one city or between different cities.

Network topologies in data communication are greatly diversified. The topology refers to a map, or physical location, of the cables linking the devices in the network. Network topologies typically fall into one of the following types: bus, ring, star or mesh network. The ring topology connects all nodes by a serial connection while a star network connects each device to a central hub. Each of the topologies has advantages and disadvantages depending on its application.

Finally, the method of transferring data within the network is a very important characteristic. The communication options include choosing parallel or serial transmission, synchronous or asynchronous transmission, and single or multiple signal transmission capabilities.

The hardware and software rules and procedures, called protocol, dictate how and when data is transferred. Most networks utilize serial asynchronous transmission protocols. Asynchronous transfer, used in most LANs, uses continuous bursts of fixed-length packets, or cells, to transmit data. But because the transfer is not synchronous, signal information indicating the start and stop point of the signal must be included with the substantive data being sent. As a result, asynchronous transfer loses transmission efficiency by having to send procedural data.

While many systems utilize serial asynchronous transmission, they differ on the protocol used in the system. A protocol is a set of rules that determines how and when the users get to send information across the network. Protocol options include Ethernet carrier sense multiple access/collision detection (CSMA/CD), token-passing, or multiplexing. Token-passing protocol only allows one device, the one with the token, to transmit on the network at any one time. Conversely, the ethernet carrier sense multiple access/collision detection (CSMA/CD) protocol is essentially a random access, first in time rule. The first device to transmit on the network without encountering a collision wins the right to finish its transmission. When a collision does occur, both devices to cease transmission, reset, and wait a random period of time before retransmitting. Lastly, multiplexing spaces out the time or wavelength of the transmission between all the inputs, so they each take turns sending information.

A typical network communication involves computers and peripherals connected in a LAN by a mesh or ring topology. Different LAN systems are then connected in a larger network, like a WAN, using a ring topology. Often, the internetwork link is called a backbone, a very high data-rate link.

While Ethernet protocol and hardware is ubiquitous for LAN systems, it has not been a viable option for WAN operation. The ethernet collision detection protocol limited the overall length of the network. For a data packet to successfully transmit on ethernet protocol, the time for the packet to transmit with no collision detection being returned to the sender is theoretically equivalent to the round trip of the furthest path in the network. For a WAN, this distance can be very high. Using ethernet collision detection protocol on a WAN would increase the frequency of collisions, and increase the response time to a point where the system may be perpetually incapacitated. Hence, a need existed for a different protocol that would successfully transmit an ethernet packet on ethernet hardware over a long distance while assuring equity to transmit on the network. In this way, communications between LANs could be seamless, efficient, reliable, and cost-effective.

As networks become larger and devices transfer more data, a need arises for the links between networks to operate at a very high transmission rate with an associated high-speed protocol. Also, because of the high-cost of the physical layer of a network, a need exists for expansion technology to utilize existing equipment and interfaces while allowing increases in operating performance. As such, it would be prohibitively expensive to tear out existing ring topology WAN networks and replace them with a new type of topology.

In an effort to meet increased bandwidth transmission demands, fiber optic systems have been favored for many backbone connections in a WAN network due to their greater traffic-carrying capacity. In response, the industry developed a standard for fiber optic communication called synchronized Optical Network (SONET) to allow transmission systems to be interoperable. With transmission rates in the order of gigabits per second, the prior art has the capability of meeting the high transmission-rate needs. However, the prior art has many limitations that detract from its usefulness.

SONET requires the use of SONET protocol for transmission over the fiber optic link. Thus, all LAN data must be translated twice. For example, if data is to be sent from LAN 'X' to LAN 'Y' over a SONET link, then the LAN frame configuration protocol (i.e. ethernet) must be translated into the SONET frame configuration at the data enters the SONET Link. Likewise, the SONET frame configuration must be translated to the LAN frame configuration when data leaves SONET and enters the LAN. This step requires complex and computationally-intensive translations. The translations incur extra costs, overhead, and latencies when ethernet packets running over LANs are converted to frames in a SONET or an equivalent protocol. Consequently, the conversion/reconversion of data frames from one protocol to another is computationally expensive, time-consuming, and inefficient.

Furthermore, the SONET frame is inflexible. It cannot be modified to a specific network link or network protocol. Thus even if the network connection is point-to-point, SONET still requires source and destination addresses in the frame overhead. Hence, the overhead can be redundant and wasteful. Furthermore, the circuit-switch based modulation/ demodulation is an unnecessary complication for packet switching. Thus a need exists for a network communication to communicate with LAN's without timely and complex translations and without redundant overhead.

Another limitation of the prior art is its high cost. As its name implies, SONET requires the use of fiber optic cable. SONET does not have the flexibility to operate on different types of a physical layer. Hence, if a user has a metal cable network (i.e., on a WAN) and wants to use the SONET standard, the system must undergo a costly transformation from cable to fiber optics. In light of this limitation, a need exists for a high transmission rate network that has the flexibility to run on either a cable physical layer with its standard equipment or on the more costly fiber optic physical layer.

The prior art protocol uses time division multiplexing to divide the transmission resources between multiple nodes. A guaranteed minimum bandwidth for each ensures access to the network. Similarly, a preassigned maximum bandwidth from each node prevents overloading the network. Unfortunately, this protocol does not take advantage of local traffic conditions between nodes in a WAN. Thus, for example, one node may need to transmit data at a rate equal to the capability of the system to an adjacent node. However, even if that data is the only traffic on that local link, the preassigned maximum bandwidth will limit the transmission to less than the system capability. Hence, the full capability of the system is not fully utilized because of the inflexible preassigned maximum bandwidth for each node. Consequently, a need exists for a flexible protocol that has the flexibility to regulate data transmission on a local and an overall scale that allows the system to be used to its fullest potential.

Finally, the prior art has no method for guaranteeing fairness among the different sources of data. Hence, one node might have better access to the network and be able to send more data than an adjacent node. Fairness becomes an issue when the demands for transmitting data exceed the system's capability. At that point, a node or device must be controlled as to how and when it accesses the transmission network. For ethernet collision detection protocol and for token passing, the ability to transmit on the network is determined by randomness. There is no protocol or algorithm for dividing the limited resources of the network to ensure each user or node gets an equal chance of transmitting or receiving their data on the network.

Prior Art FIGS. 1A, 1B, and 1C, present a logical illustration of various alternative network protocols in the prior art is presented. A communication network 105, such as a WAN or MAN, has Nodes 1, node 2, node 3, and node 4 are communicatively coupled by communication links 106. Tributary communication links 107 connect each node to another communication network, such as a LAN. Information is transmitted on the network in the form of data packets. The packet typically contains administrative data, such as the sender and receiver address and error-control information, and substantive data. The protocol of the network dictates the length and specific contents of the packet. For any sizable amount of information, more than one data packet will be required to send the entire batch of information. Hence a device may want to transmit a series of data packets, called a packet stream, on the network from one node to another.

Prior Art FIG. 1A represents a full-speed network access protocol. Communication network 105 uses a full-speed protocol that allows any node to transmit a data packet on the network in a direction 118 along the network. The protocol is representative of ethernet. Any packet from any node can try to transmit at one-hundred percent from any node at any time the network is not in use. When the network is not busy, or when just one node wants to transmit, this process works without collisions. However, when the network becomes busy, i.e. when many nodes want to transmit, then collisions on the communication network will occur as indicated. The values of "1" by communication link 107 indicates that the node wants to transmit its data at 100% of the network's capacity. When node 2, 3, and 4 all want to transmit at 100% capacity, a collision will occur, and the system will not be able to transmit data from any node. Hence, when collisions occur, the system becomes bogged down is unreliable and inefficient. The net result is wasted time, unused network resources, and repeated attempts to resend data.

Referring now to Prior Art FIG. 1B, an equal right network access protocol is presented. In this protocol, upstream nodes always half the available transmission resources available to them. As a result, a downstream node will have a disproportionately large share of the network's transmission resources. Conversely, the upstream nodes will eventually approach zero transmission rate. For example, in FIG. 1B, node 2 has a ½ transmission rate (i.e. 50% of the network's transmission capability) while node 3 has a ¼th (25%) transmission rate and node 4 has a ⅛th (about 12%) transmission rate. Overall, the communication network's resources are distributed in a very nonlinear fashion (i.e. 50%, 25%, 12%, etc.). Furthermore, the network capacity is not fully utilized (i.e. 50%+25%+12%=87%). Hence, quality of service suffers severely for users on upstream nodes as they have to wait longer for access to the network. As a result, the communication network performance has low utility to the users and can result in significant wait times and inefficient transmission of data Referring now to Prior Art FIG. 1C, an upstream first network access protocol is presented. In this protocol, upstream nodes have the first chance to use the full resources of the network. Again, this is unfair because an upstream node can utilize the full capacity of the network without sharing with downstream nodes. Thus, node 4 has a 1 (or 100%) transmission rate on the network. Quality of service to users on downstream nodes suffers in this method as well.

Overall, Prior Art FIGS. 1A, 1B, and 1C illustrate the prior art attempts to solve the problem of distributing limited communication network resources. However, these solutions have significant limitations and do not work effectively. The prior art solutions do not provide fair access of the network's transmission resources to the different nodes. Rather, an uneven or biased transmission rate exists for the nodes trying to transmit in the network. Therefore, a need exists for a protocol and algorithm to regulate traffic flow in a fair manner to improve quality of service and reliability.

In summary, a need exists for a network system and a method for transmission on the network that has a high transmission-rate at a low cost. Still another need exists for a transmission protocol and architecture that does not require complex and computationally-intensive translation from the existing LAN protocols. A further need exists for a network transmission protocol and architecture that has flexibility to adjust its transmission capabilities to high and low data traffic conditions between networks and between local nodes. Yet another need exists for a network transmission protocol that has the flexibility to operate on different types of physical layer such as fiber or cable. Lastly, there is a need for a protocol to regulate traffic in a manner that ensures fairness in the amount of data transmitted on the network. The present invention provides a solution that satisfies all these needs.

OBJECTS AND SUMMARY OF INVENTION

The present invention provides for a network system and a method for transmission on the network that has high transmission-rate capability at a low cost. The present invention also provides a transmission protocol and architecture that does not require complex and computationally-intensive translation from the existing LAN protocols. Additionally, the present invention provides a network transmission protocol and architecture that has flexibility to adjust its transmission capabilities to high and low data traffic conditions between networks, and between local nodes. The present invention also provides a method of transmission on a network that allows flexibility to operate on different types of the physical layer such as fiber or cable. Finally, the present invention provides a protocol to regulate traffic in a manner that ensures fairness in the amount of data transmitted on the network.

Specifically, in one embodiment, the present invention recites a method for communicating on a communication network. The method comprises several steps, the first of which is to determine the flow path for all the data packets queuing up to transmit on the communication network. Limits are calculated for each of the flow paths within the communication network in such a manner to allow the devices fair access to communicate on the communication network. The present embodiment then limits the data packets transmitted in the communication network according to the calculated limits.

In another embodiment, the present invention is a communication network system comprising a plurality of network nodes each having a processor and a controller. A communication medium links the controllers of the network nodes with a computer readable memory coupled to communicate with the processor. In the present embodiment, the processor performs the following steps. The flow path is determined for all the data packets queuing up to transmit on the communication network. Limits are calculated for each of the flow paths within the communication network in such a manner to allow the devices fair access to communicate on the communication network. Transmission of the data packets is limited on the communication network according to the calculated limits.

These and other objects and advantages of the present invention will no doubt become obvious to those of ordinary skill in the art after having read the following detailed description of the preferred embodiments that are illustrated in the various drawing figures.

BRIEF DESCRIPTION OF THE DRAWINGS

The accompanying drawings, which are incorporated in and form a part of this specification, illustrate embodiments of the invention and, together with the description, serve to explain the principles of the invention.

PRIOR ART

Figure 1A:
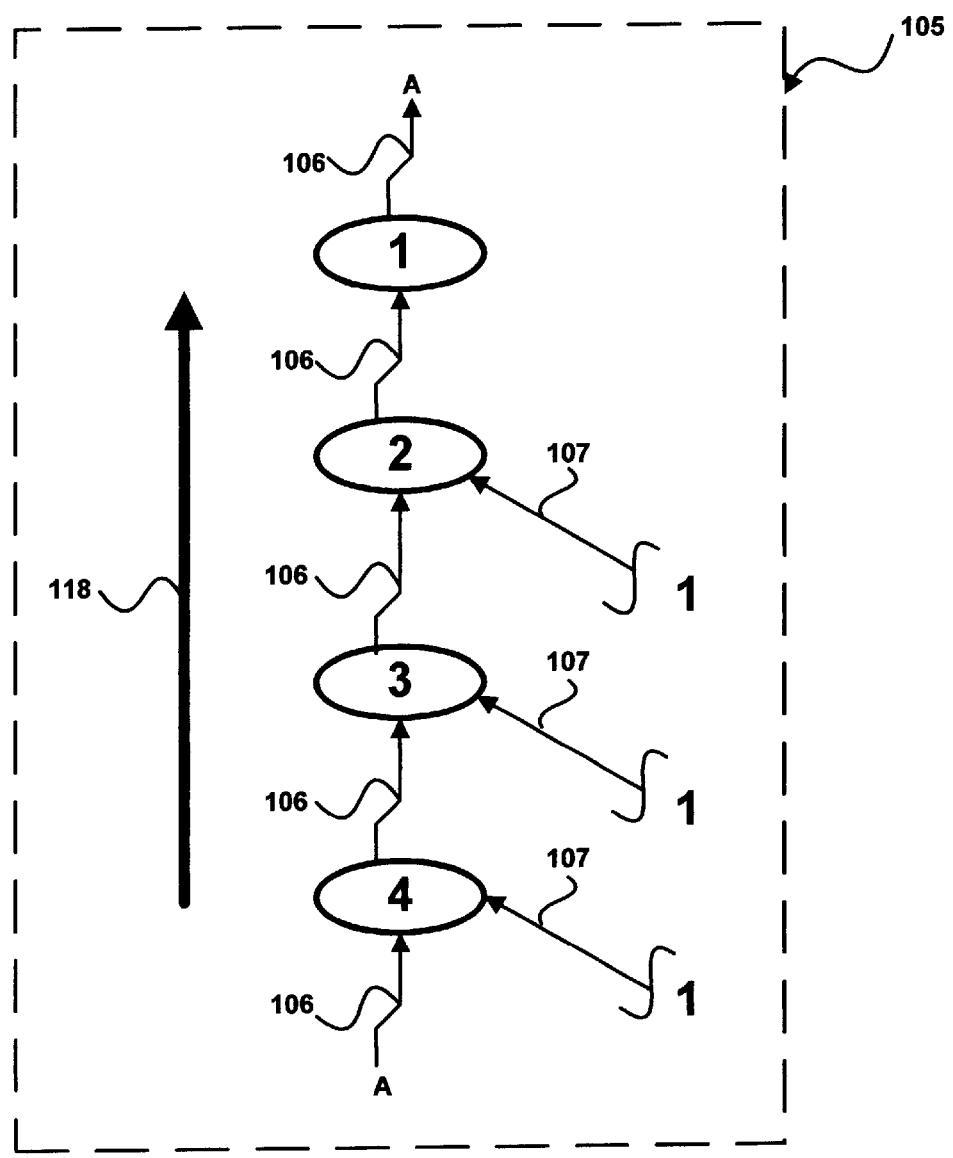
FIGS. 1A–1C are logical representations of a communication network in accordance with the prior art.
Figure 1B:
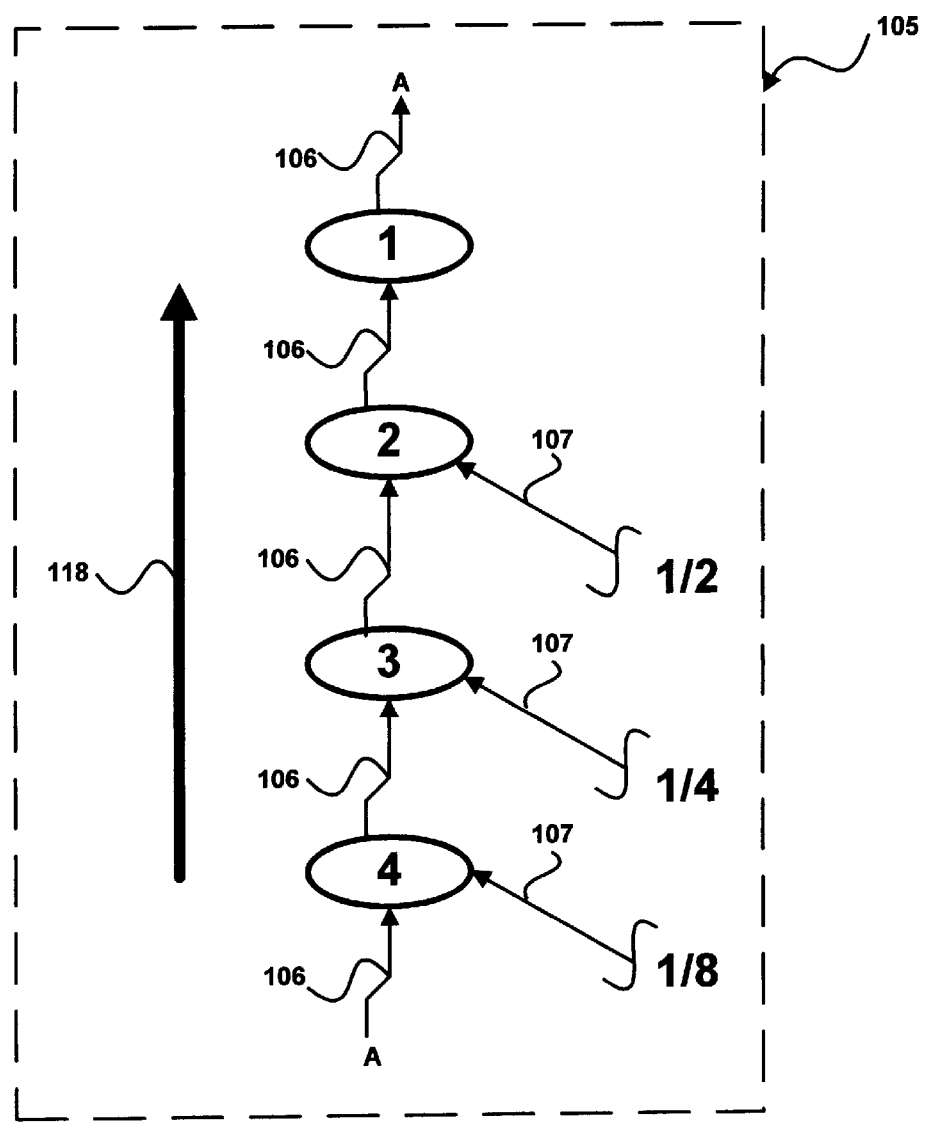
Figure 1C:
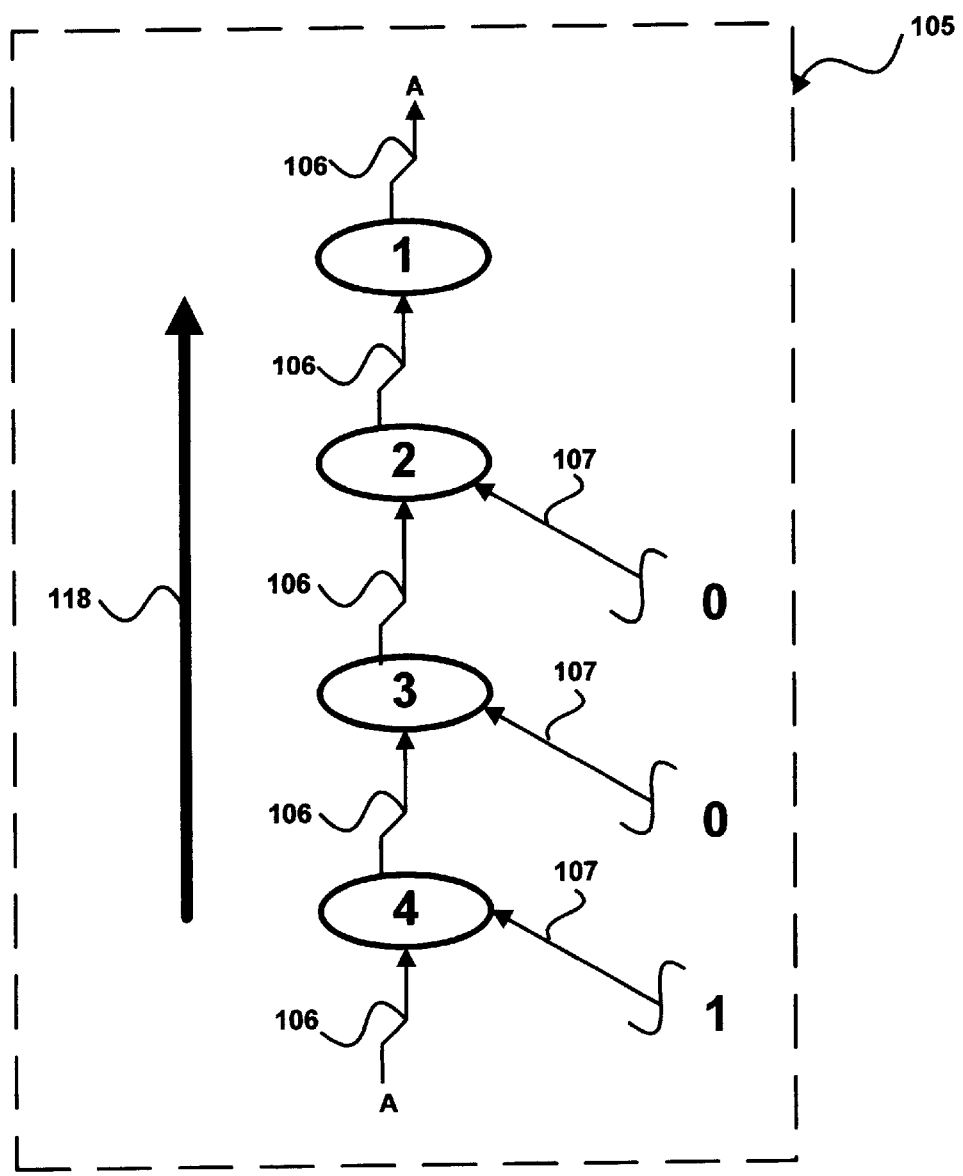

The drawings referred to in this description should be understood as not being drawn to scale except as specifically noted.

BEST MODE FOR CARRYING OUT THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Some portions of the detailed descriptions which follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, etc., is conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proved convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "receiving", "transmitting", "determining", "calculating", "reporting", or the like, refer to the actions and processes of a computer system, or similar electronic computing device. The computer system or similar electronic computing device manipulates and transforms data represented as physical (electronic) quantities within the computer system's registers and memories into other data similarly represented as physical quantities within the computer system memories or registers or other such information storage, transmission, or display devices. The present invention is also well suited to the use of other computer systems such as, for example, optical and mechanical computers.

COMPUTER SYSTEM ENVIRONMENT OF THE PRESENT RATE-BASED FLOW CONTROL PROTOCOL ON AN ETHERNET-OVER-RING COMMUNICATIONS NETWORK

Figure 2:
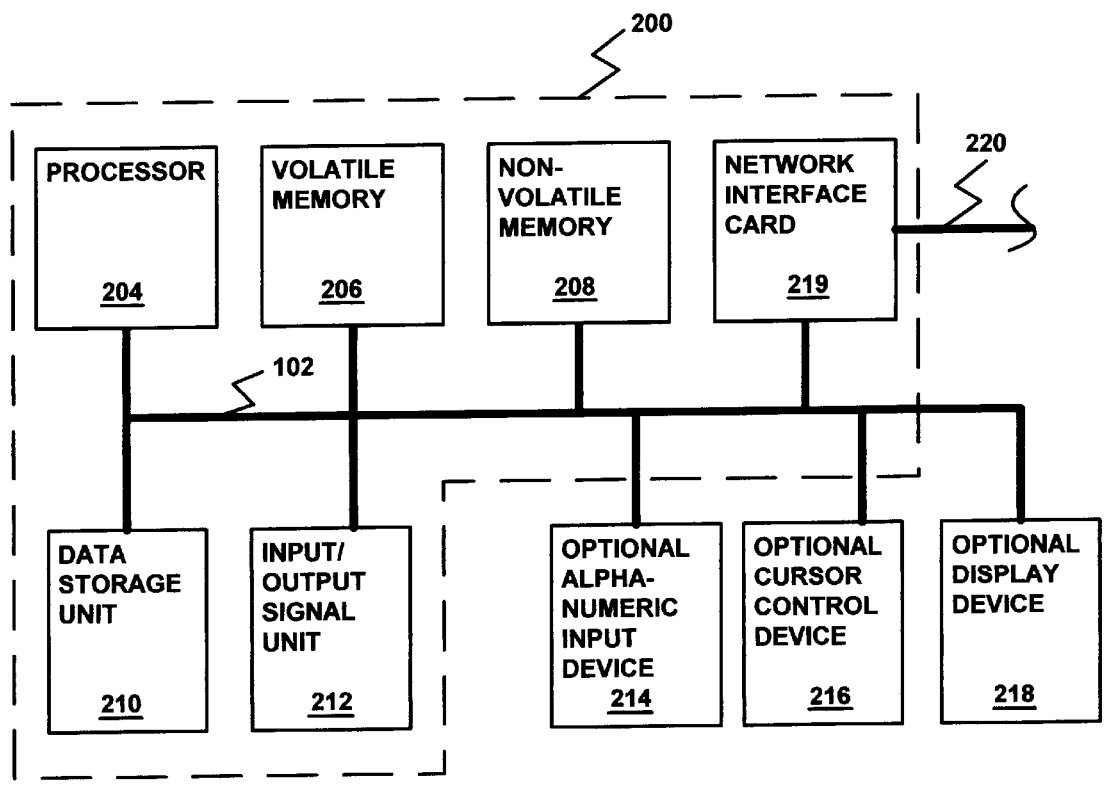
FIG. 2 is a logical representation of an exemplary computer system used in accordance with the present invention.

With reference now to FIG. 2, portions of the present method for rate-based flow control protocol on ethernet-over-ring network communications are comprised of computer-readable and computer-executable instructions that reside, for example, in computer-usable media of a computer system. FIG. 2 illustrates an exemplary computer system 200 used as a part of a network communication system in accordance with one embodiment of the present invention. It is appreciated that system 200 of FIG. 2 is exemplary only and that the present invention can operate within a number of different computer systems including general purpose computer systems, embedded computer systems, and stand alone computer systems specially adapted for network communications.

System 200 of FIG. 2 includes an address/data bus 202 for communicating information, and a central processor unit 204 coupled to bus 202 for processing information and instructions. System 200 also includes data storage features such as a computer usable volatile memory 206, e.g. random access memory (RAM), coupled to bus 202 for storing information and instructions for central processor unit 204, computer usable non-volatile memory 208, e.g. read only memory (ROM), coupled to bus 202 for storing static information and instructions for the central processor unit 204, and a data storage device 210 (e.g., magnetic or optical disk and disk drive) coupled to bus 202 for storing information and instructions. A signal input output communication device 212 (e.g. a modem) coupled to bus 202 is also included in system 200 of FIG. 2. System 200 of the present server sizing system also includes an optional alphanumeric input device 214 including alphanumeric and function keys is coupled to bus 202 for communicating information and command selections to central processor unit 204. System 200 also optionally includes a cursor control device 216 coupled to bus 202 for communicating user input information and command selections to central processor unit 204. System 200 of the present embodiment also includes an optional display device 218 coupled to bus 202 for displaying information.

Display device 218 of FIG. 2, utilized with the present method for rate-based flow control protocol on ethernet-over-ring network communications, may be a liquid crystal device, cathode ray tube, or other display device suitable for creating graphic images and alphanumeric characters recognizable to a user. Optional cursor control device 216 allows the computer user to dynamically signal the two dimensional movement of a visible symbol (cursor) on a display screen of display device 218. Many implementations of cursor control device 216 are known in the art including a trackball, mouse, touch pad, joystick or special keys on alphanumeric input device 214 capable of signaling movement of a given direction or manner of displacement. Alternatively, it will be appreciated that a cursor can be directed and/or activated via input from alphanumeric input device 214 using special keys and key sequence commands. The present invention is also well-suited to directing a cursor by other means such as, for example, voice commands.

System 200 also includes an interface feature that allows it to communicate with devices outside of the system 200. Specifically, network interface card 219, also known as a controller, adapter card, or interface board, is normally installed in a system expansion slot within system 200. The controller formats data into frames for transmission on a transmission link 220. Typically, the transmission link connects the computer system 200 to a local area network (LAN) or some other communication network.

The system 200 has been described in a manner to enable the implementation of embodiments of the present invention. A more detailed discussion of the present method rate-based flow control protocol on an ethernet-over-ring communications network is found below.

GENERAL DESCRIPTION OF THE PRESENT RATE-BASED FLOW CONTROL PROTOCOL ON AN ETHERNET-OVER-RING COMMUNICATIONS NETWORK

Figure 3:
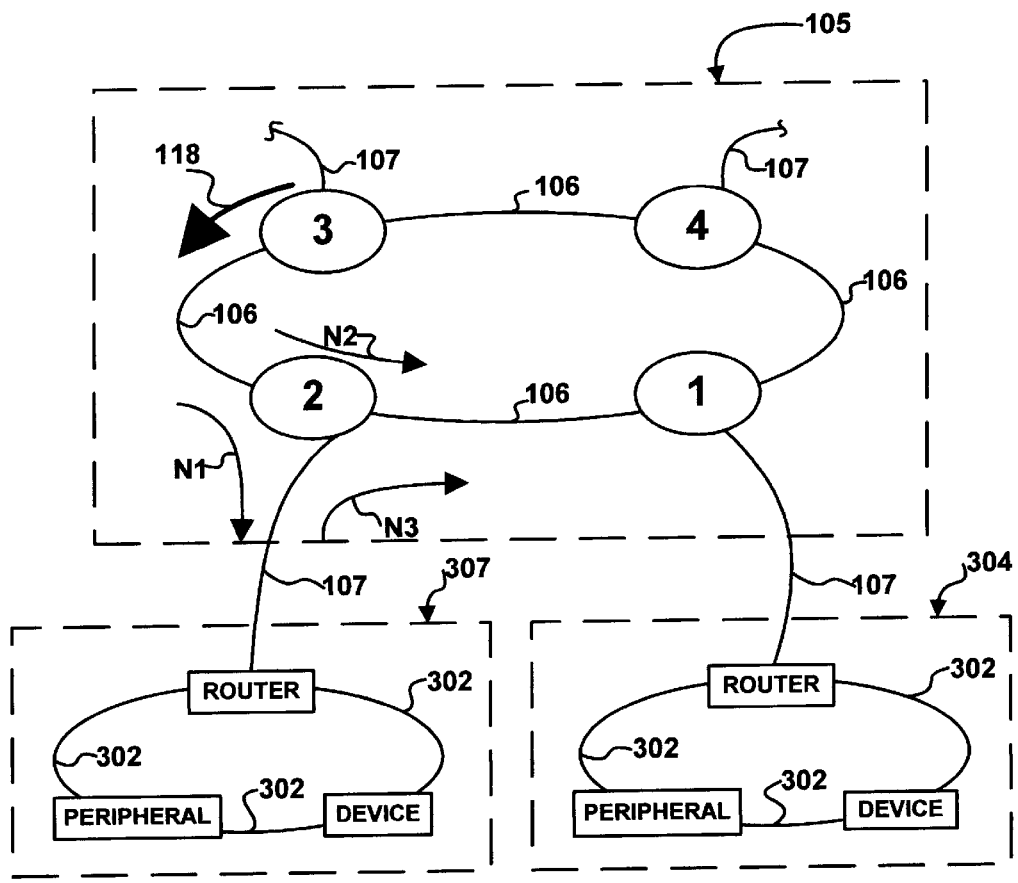
FIG. 3 is a logical representation of a communication network used in accordance with the present invention.

Referring now to FIG. 3, the wide area network (WAN) 105 is shown interconnecting local area network (LAN) 304 and local area network 307. Although a WAN is cited in the present embodiment, the present invention is also well-suited to any size of communication network configuration, such as a metropolitan area network (MAN). The WAN 105 has a ring type of network topology with the direction of transmission of data around the ring indicated by the arrow 118. The present invention is well-suited to any type of ring topology configuration including, but not limited to, fiber distributed data interface (FDDI), full-duplex, half-duplex, etc. While a WAN is cited in the present embodiment, the present invention is also well-suited to a number of different network configurations such as a backbone, or a bus network. Additionally, while the WAN 105 and LANs 304 and 307 have a specified number of nodes, the present invention is well-suited to a network having any plural quantity of nodes.

Referring still to FIG. 3, the two LANs might represent a computer network for an engineering and an administrative facility. The LAN communication networks are comprised of a router linked to the WAN by a communication link 107. Within the LAN, communication links 302 link computer devices and peripherals such as computers, printers, memory devices, servers, hubs, clients, etc. Communication links 106, 107, and 302 can be made from cable, fiber, or some other medium to transmit data. It is understood by one ordinarily skilled in the art, that interfaces may be required to make different types of communication links, such as SONET and ethernet, compatible. With these interfaces, the present invention will operate on any communication link medium. Also, a hub, bridge, etc. may be used in place of the router device to support communications between devices and networks.

Referring still to FIG. 3, an upstream-to-downstream flow path N2 represents the transfer of a data packet onto the WAN 105 in direction 118 past node 1. For this flow path, the data packet does not originate nor terminate at node 1. Conversely, an upstream-to-tributary flow path N1 represents the transfer of a data packet from upstream of node 1 to the tributary communication link 107 and into LAN 307. Hence, an upstream-to-tributary flow path N1 allows a data packet to exit the WAN network 105. Finally, a tributaryto-downstream flow path N3 represents the transfer of a data packet from a LAN 307 through a tributary communication link 107 and into the WAN network 105. The data packet could have any of the nodes 1, 2, 3, or 4 as a destination onto the WAN network 105 except, presumably, the node from which it originated.

Figure 4:
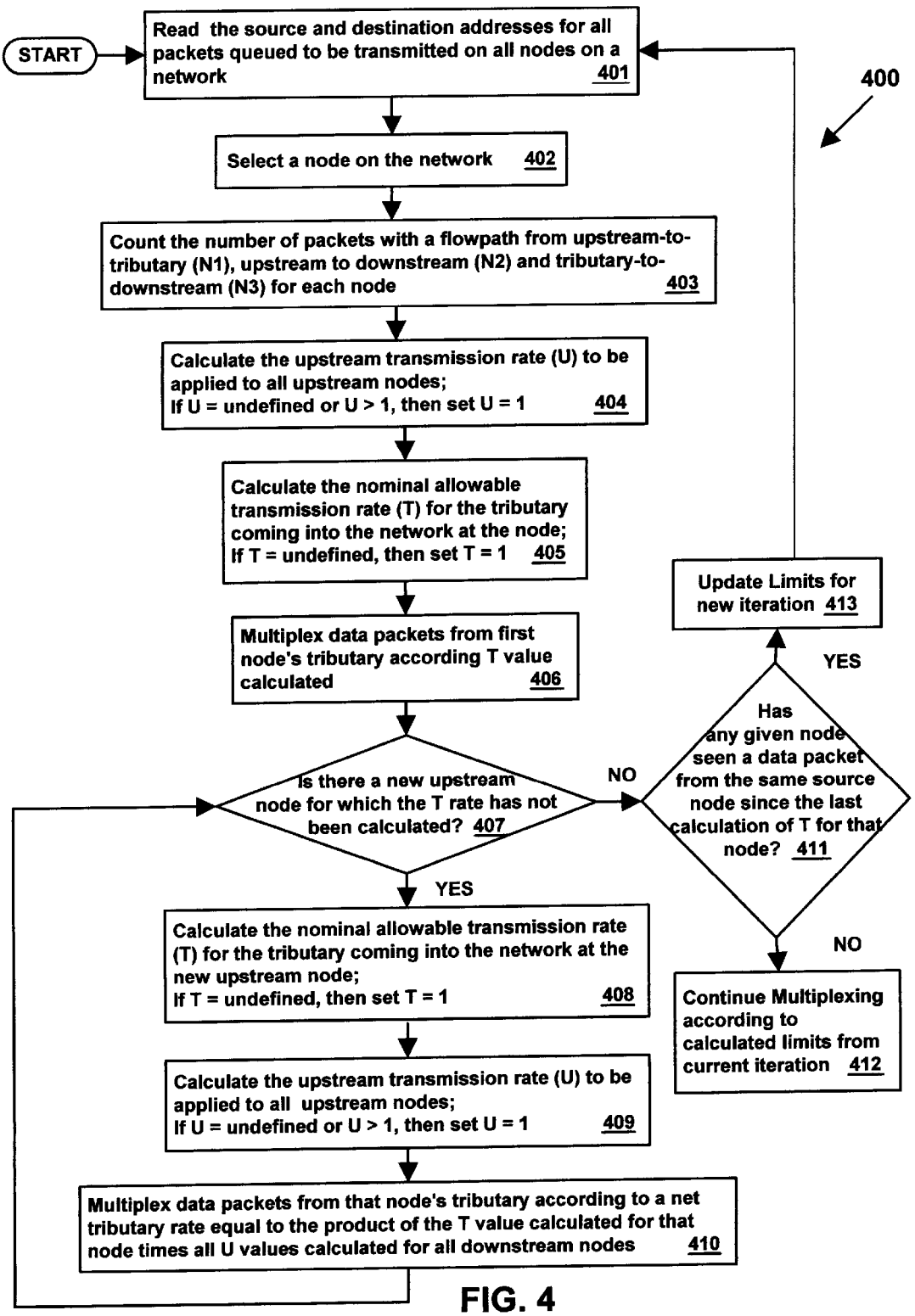
FIG. 4 is a block diagram of the algorithm for allowing fair access to communication network used in accordance with the present invention.

FIG. 4 presents a flowchart describing, in detail, the steps for performing a rate-based flow control protocol process on an ethernet-over-ring communications network according to the present invention. Process 400 is implemented as program instructions stored in computer-readable memory units 206 or 208 of computer system 200 and executed by central processor 204. In the present embodiment of the present invention, step 401 determines the source and destination addresses of all data packets entering, traveling within, or leaving the WAN 105. The source and destination address indicate which flow path, N1, N2, or N3 that the data packet will use with respect to each of the nodes 1, 2, 3 and 4 on the WAN 105. For example, a data packet may be classified as an upstream-to-downstream flow path N2 for node 4 in the WAN 105. Similarly, another data packet may be classified as a tributary-to-downstream flow path N3 for node 2. Step 401 essentially lays out the traffic pattern on the WAN at any given point in time.

With reference now to step 402 of FIG. 4, in the present embodiment of the present invention, a first node on the WAN 105 is selected. This choice is arbitrary and may change. The results of the process are essentially the same regardless of the node selected. Step 403 counts and tabulates all the flow paths of all the data packets queued from all the network nodes on the WAN network 105 with respect to each of the network nodes.

Referring now to step 404 of FIG. 4, an upstream transmission factor, U, that will be applied to all upstream nodes, is calculated. In the present embodiment of the present invention, the formula for calculating the upstream transmission factor with respect to a given node is:

$$U=(N1+N2)/(N2+N3)$$

This formula represents the number of data packets with a flow path into the node divided by the number of data packets with a flow path out of the node. Specifically, the flow paths in to the network node include the upstream-to-tributary flow N1, the upstream-to-downstream flow N2. Likewise, the flow paths out of the network node include the upstream-to-downstream flow N2 and the tributary-to-downstream flow N3. Regardless of whether the data packet coming from upstream the node are destined for the tributary of that node or for downstream of the node, they count as data packets coming into the node. Similarly, regardless of whether the data packets originate from the tributary or from upstream the node, if they flow downstream into the WAN network 105, they count as data packets leaving the node.

While the above formula is cited in the present embodiment, the present invention is also well-suited to a number of different formulas that control the flow rates from network nodes on the WAN network 105. For example, the formula could be created so as to provide a preference to certain nodes on the network, such as an important server, or to derate other nodes, such as an unimportant device on the network. Likewise, the formula could be dynamic, having a different relationship depending on the time of day, occurrence of an event, etc.

Referring now to step 405 of FIG. 4, a maximum allowable tributary transmission rate, T, that will be applied to the tributary connected to the node in question is calculated. In the present embodiment of the present invention, the formula for calculating maximum upstream transmission rate with respect to a given node is:

$$T=(N3)/(N2+N3)$$

This formula represents the number of data packets with a flow path from the tributary to downstream of the node (N3) divided by the sum of the data packets leaving the node going downstream (N2+N3) into the WAN network 105. This formula essentially calculates the tributary's fractional value of the flows that are immediately downstream of a given node. In this manner, the multiplexing can be divided according to the fractional value. While the above formula is cited in the present embodiment, the present invention is also well-suited to a number of different formulas that likewise will be used to regulate the data packets that will flow downstream from a given node, regardless of their origin. For example, the formula could be creates so as to provide a preference to certain tributaries on the network, such as an important device or LAN. Likewise, the formula could be dynamic, having a different relationship depending on the time of day, occurrence of an event, etc.

Referring now to step 406 of FIG. 4, data packets from the starting node's tributary are multiplexed onto the WAN network communication link according to the calculated value of T. The fraction value of the tributary flow rate T, indicates how frequently a packet from that tributary will be allowed to be multiplexed onto the network. This process is illustrated further in FIG. 7. While the present embodiment uses time division multiplexing (TDM), the present invention is also well suited to frequency division multiplexing (FDM) or pulse division multiplexing (PDM). Likewise, while the present embodiment illustrates a single channel for the communication link, the present invention is well suited to multiple channels or to multi-mode transmission on a single channel (i.e. using fiber optics). With a multiple-channel transmission link, the present invention would simple divide the transmission resources using the same limits. Thus, instead of receiving a fraction of time or packet transmission on a single channel, a fraction of the available channels might be designated to a node.

As mentioned, while the present embodiment utilizes an evenly distributed flow rate between all nodes, the present invention is well-suited to weighting the tributary flow rates according to some other strategy. For example, the tributary and upstream limits could contain a weighting factor that would favor one and disfavor the other while maintaining conservation of flow of the data packets.

With reference now to step 407 of FIG. 4, a determination is made as to whether any upstream nodes have not had a T rate calculated for the current iteration. If all nodes have had a T value calculated, then the system proceeds to the question 411. If, on the other hand, there are nodes that have not had a T rate calculated, the process proceeds to step 408.

If the answer to step 407 is Yes, then step 408 is performed instead of step 411. Step 408 and 409 calculate the maximum allowable transmission rates for the tributary and upstream node for all nodes on the network other than the first node calculated in steps 402 through 406. Like steps 404 and 405, the maximum transmission rates and factors are again calculated for the balance of the nodes in the network in an iterative fashion.

Referring still to FIG. 4, the tributaries on all other nodes are multiplexed according to step 410. In step 410, the net maximum allowable transmission rate is calculated as the product of all the U upstream transmission factors calculated for all downstream nodes in the communication network times each other and times the current node's maximum tributary transmission rate T. In this way, the need of downstream tributaries to communicate on the network is passed upstream via the U value. In turn, the U value restricts the rate of upstream tributaries and provides opportunity for the downstream node to communicate on the network. Step 410 is repeated until all nodes have been addressed.

In step 411 of FIG. 4, a determination is made whether any given node has seen a data packet with the same source node address in the time-period since the last calculation of T was performed. If there has been no data packets with a duplicate source address, then the multiplexing at all the nodes continue at the already calculated rates. If, on the other hand, a node sees a data packet with a duplicate source address within the time period of the last calculation of T, it indicates that one of the transmission rates from one of the nodes may have changed since the last calculation of T and U. In this case, all the limits are recalculated starting with step 401.

Step 411 provides the strategy for repeating or updating the process. Step 411 queries the system as to whether any node has seen a repeat packet from the same source node. In other words, if ten nodes on a network all send their data sequentially through a node 1, when node 1 sees the second packet from node 2, then it will answer step 411 affirmatively. If the answer is affirmative, then step 413 requires the limits be updated. Hence, the process begins a new at step 401. While the present embodiment updates the transmission limits of the tributaries based on a repeated source packet, the present invention is well-suited to an update by any other means. For example, the system could be updated at a predetermined fixed-time interval, at the occurrence of some new event such as a transmission from a formerly silent node, or upon some other useful strategy.

Figure 5:
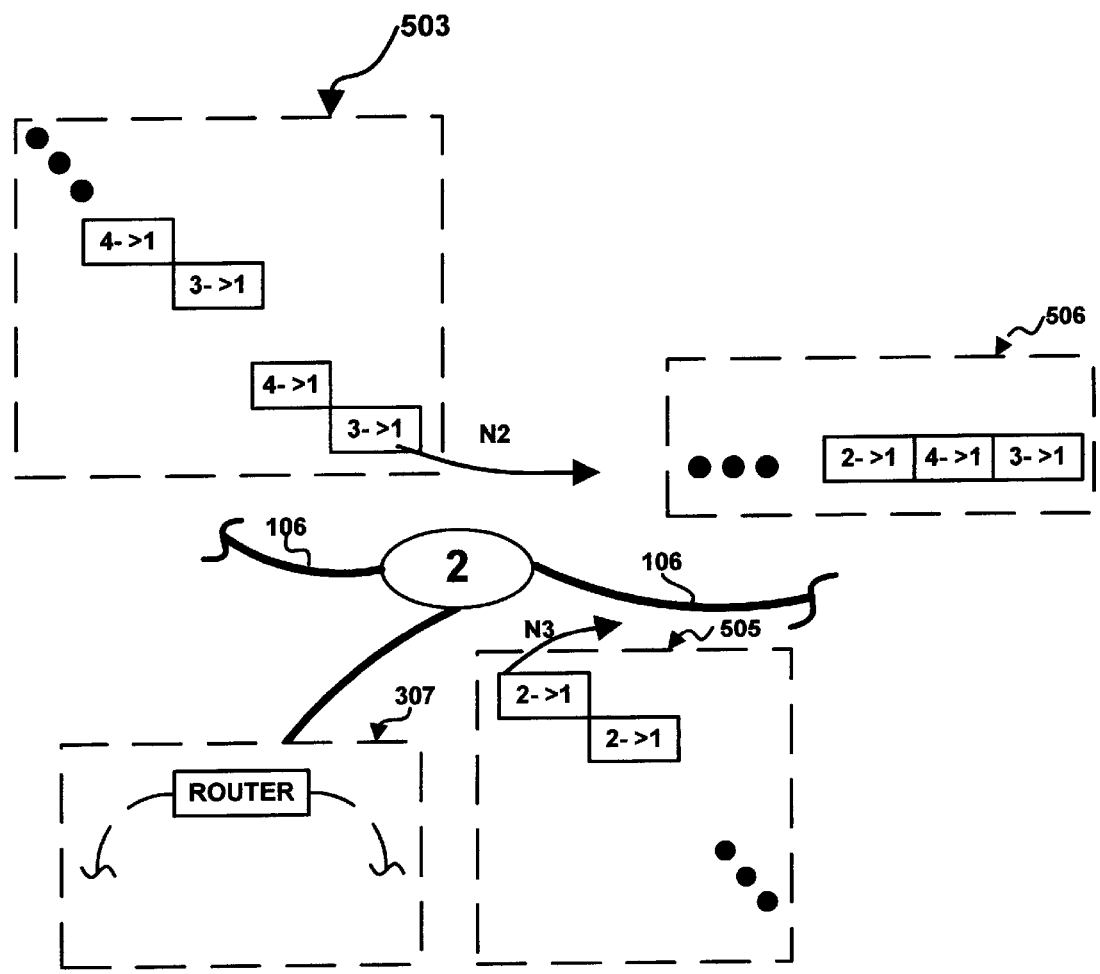
FIG. 5 is an example of the process for multiplexing data packets on the communication network used in accordance with the present invention.

Referring now to FIG. 5, an example of the process for multiplexing data packets on the communication network is presented. Node 1 has the following flow paths entering into it: a) one data packet, labeled 2–>1, of a stream of data packets sourced from node 2 and destined for node 1; b) one data packet, labeled 3–>1, of a stream of data packets sourced from node 3 and destined for node 1; and c) one data packet, labeled 4–>1, of a stream of data packets sourced from node 4 and destined for node 1. All of these data packets have a destination downstream of node 1. Two of these data packets are coming into node 2 and flowing downstream of node 2, while one of these data packets is coming from node 2's tributary. Hence, the three streams of packets must be multiplexed in order to equitably share the limited transmission capability of transmitting one packet at a time.

If the rate-based protocol of the present invention is followed for this scenario, i.e. By utilizing FIG. 4, then the following limits arise. The upstream has a limits of ⅔ above node 2 and node 2's tributary has a limit of ⅓. As a result of these limits, the upstream is allowed to transmit two data packets through node 2. Once the transmission limit is attained, a signal such as an Xoff signal is sent to all upstream nodes to stop the upstream traffic. Likewise, a signal, such as an Xon signal, is sent to the node 2's tributary allowing it to transmit data. In this example, the output of data packets from node 2 has the following sequence of data packets: data packet 3–>1, 4–>1, and 2–>1. If there are no changes to the packet streams that want to be transmitted on the network, then the pattern indicated will continue until all the data packets in the packet stream are depleted. In this manner, the transmission of data from different nodes is equitably accomplished in a very quick and efficient way.

Transmission of data packets from the nodes in the network is controlled by sending Xon and Xoff signals that tells the nodes when to communicate. The Xon/Xoff signals and the node hardware are ethernet compatible. As a result, if a LAN is operating under an ethernet protocol, the WAN can be operated using the same equipment. Thus, the present invention overcomes the high cost of using a totally different protocol and hardware for communicating on a WAN. Furthermore, the present invention avoids the time-consuming, computationally intensive, and expensive data packet translation from a protocol used on the LAN to the protocol used on the WAN. One additional benefit of the present invention is its ability to harmoniously coexist or to completely replace alternative protocols. Thus, for example, a token-based WAN connecting Ethernet-based LANs can be replaced with ethernet on the WAN. Likewise, a SONET based fiber optic cable WAN can be displaced by the rate-based protocol on all, or on a fraction of, the channels of a multi-channel/multi-mode fiber network.

While the present embodiment utilizes Xon and Xoff signals to routers at each node, the present invention is well-suited to other means of communicating a signal and switching the nodes. For example, in a wavelength-division-multiplexed system on a multi-channel WAN physical layer, the rate-based protocol could send signals to the optical switching and multiplexing equipment at each node on the network to indicate on which wavelength it may communicate a data packet. Furthermore, the signals to the node could indicate the length of the data packet as well, thus producing asynchronous transmission of data.

EXAMPLE SCENARIOS AND CALCULATIONS OF THE PRESENT RATE-BASED FLOW CONTROL PROTOCOL ON AN ETHERNET-OVER-RING COMMUNICATIONS NETWORK

Figure 6A:
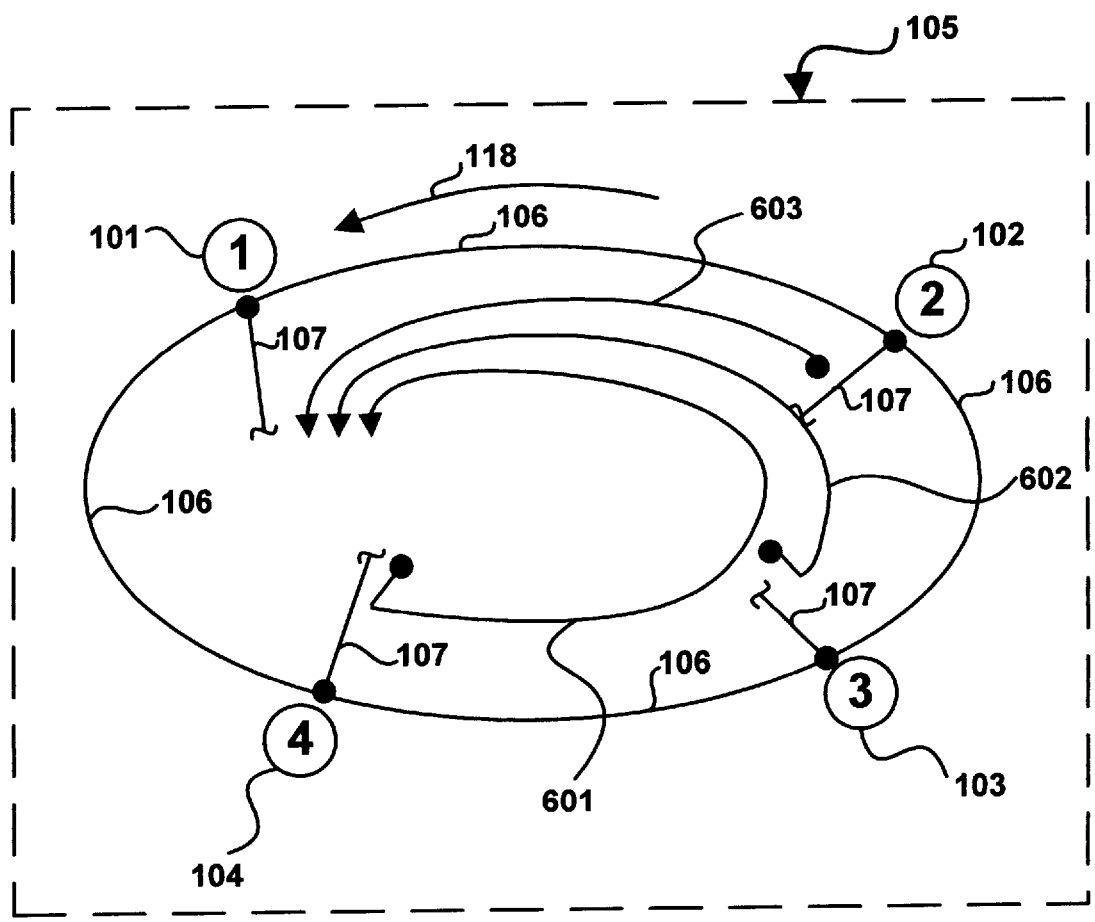
FIG. 6A is a pictorial representation of a first transmission scenario on a communication network in accordance with the present invention.
Figure 6B:
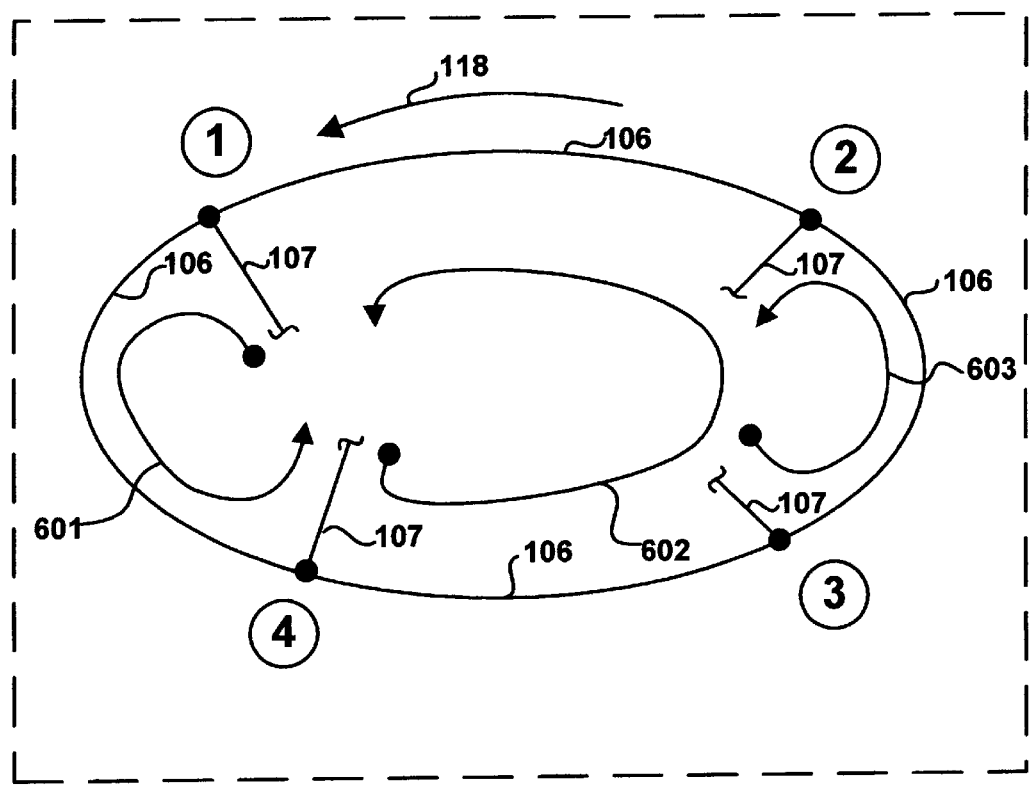
FIG. 6B is a table of the calculations performed for the rate-based protocol as applied to FIG. 6A in accordance with the present invention.

FIGS. 6A and 6B present two network transmission scenarios to illustrate the operation of the flow-rate based protocol. In accord with those Figures, Table 1 and Table 2 below present the calculations required for the rate-based protocol as applied to FIGS. 6A and 6B. The scenario of FIG. 6A will be presented first, followed by the scenario of FIG. 6B.

In FIG. 6A, flow path 601 represents the route for a data packet sourced at node 4 and destined for node 1. Similarly, flow path 602 represents the route for a data packet sourced from node 3 and destined for node 1, and flow path 603 represents the route for a data packet sourced from node 2 and destined for node 1. This example illustrates a condition where network traffic builds up because of overlapping flow paths. Here, flow path 601, 602, and 603 overlap as they all travel to node one. In this example, the transmission of data packets is serially accomplished by time division multiplexing (TDM). However, as previously stated while the present embodiment is for TDM, the previous invention is also well-suited to other forms of multiplexing and data combination. The present invention is a method and apparatus for allocating limited resources, whatever they may be, between demands that exceed the resources.

In Table 1, shown below, the numeric calculations for the transmission scenario of FIG. 6A are calculated according to the flowchart of FIG. 4. Table 1 is filled in by picking a node as required in box A. The first row of data in the matrix is filled with data applicable to node 1. Likewise, the second row of data, the third row of data, and the fourth row of data are filled in with the data applicable to the respective network node. The flow paths for data packets along either the N1, N2, and N3 flow path are counted for each node as required in box B. The definitions of N1 through N3 were provided earlier in this section. For example, N1 equals the number of uniquely-sourced data packets having a destination of node 1. In this case, three different nodes are sending data packets to node 1. Hence, N1 equals three. Similarly, N2 is the number of different-sourced data packets that will pass node 1 and not exit the network into node one's tributary. The value of N2 for node 1 is zero. Likewise, N3, is the number of data packets sourced from node 1 coming into the network from node 1's tributary. The value of N3 for node 1 is zero.

tary has no data packets to place on the network, no restriction of upstream nodes is required. Thus, the value of 1 in column DA has no effect on the Net Tributary Limit calculation in column DB. Rather, the Net Tributary limit calculation is equal to the Nominal Tributary Limit calculated in column CA (i.e. $\frac{1}{3} \times 1 = \frac{1}{3}$).

This same process is repeated for nodes 3 and 4 in their respective rows. On each of the subsequent upstream nodes, the U value from all upstream nodes is cumulatively multiplied together in column DB to provide an overall restriction on the tributary for the node being evaluated. The end

TABLE 1

Application of Rate-Based Flow Control for Network Transmission Scenario in FIG. 6A.

| 1. Pick a node A | 2. Count Number of Flow(s) B | | | 3. Calculate nominal limits for each node C | | 4. Apply calculated limits to system D | |
|---|---|---|---|---|---|---|---|
| | | | | Calculate Nominal Tributary Limit (T) | Calculate Upstream transmission Factor (U) | List of all upstream transmission factors from all downstream nodes(U) | Net Tributary Limit T × Π(U) |
| Node | N1 | N2 | N3 | CA | CB | DA | DB |
| 1 | 3 | 0 | 0 | 0 | undefined, make 1 | 0 | 0 |
| 2 | 0 | 2 | 1 | $\frac{1}{3}$ | $\frac{2}{3}$ | 1 | $1 \times \frac{1}{3} = \frac{1}{3}$ |
| 3 | 0 | 1 | 1 | $\frac{1}{2}$ | $\frac{1}{2}$ | $\frac{2}{3}$, 1 | $\frac{1}{2} \times \frac{2}{3} = \frac{1}{3}$ |
| 4 | 0 | 0 | 1 | 1 | 0 | $\frac{1}{2}, \frac{2}{3}, 1$ | $\frac{1}{2} \times \frac{2}{3} \times 1 = \frac{1}{3}$ |

Referring still to Table 2, the values of T and U are calculated using the formulas provided earlier. The results are T=0 and U=undefined. Note that U is set to 1 because the mathematical value was undefined. The undefined value simply indicates that data packets are coming into the node, but none are leaving. This means that the tributary is not contributing any data packets to the network, and hence, it does not need to regulate upstream traffic in order to add a data packet onto the network. It has no data packet to transmit on the network. Thus, the U value is set to 1, or 100% transmission, for upstream nodes with respect to the needs of that particular node. The value of T for node 1 is zero because the tributary for node 1 has no data packets to send onto the network. As a result, the list of upstream transmission factors in column DA for node 1 is set to zero. This is the first node to be calculated on the network therefore the net tributary limit is dependent only on the nominal tributary limit. As a result, the net tributary limit is set to zero because the nominal tributary limit, T, equals zero.

Referring still to Table 1, values for N1, N2, and N3 are determined for the next upstream node in the network, node 2, and filled in on the second row of data. Unlike node 1, node 2 has a tributary with data packets to transmit on the network. Hence, N3 is equal to 1, while N2 is equal to 2. Because no data packets are destined to exit the network on the tributary for node 2, N1 is zero. The resultant values for T and U are $\frac{1}{3}$ and $\frac{2}{3}$ respectively. As indicated in column DA, transmission factors upstream of the node being evaluated are listed. Hence, the value of one is brought down from node 1 in column CB. This value represents the restriction that node 2 should undergo to provide node 1 with an opportunity to send data packet from its tributary onto the network. As previously mentioned, because node 1's triburesult, as seen in column DB, is a truly equal sharing of the network resources whereby tributaries on nodes 2, 3, and 4 each have a net tributary limit equal to $\frac{1}{3}$rd of the system's transmission capability.

This then is the process by which the limited resources of the communication network are equally shared throughout the system. As a result, nodes or LANs on the network are allowed fair access to transmit data packets on the network. Each tributary's need to transmit on the network is communicate upstream while each upstream flowpath is accounted for throughout the network. The result is a checks and balances system that provides equality and hence, improved quality of service. While the present invention envisions single data packets flowing from the tributary, the present invention lends itself to other formats of data, such as multiplexed data coming from the tributaries.

FIG. 6B provides a second scenario of the rate-based protocol applied to a communication network in accordance with the present invention. This scenario will show how a local flow path, if not overlapped by another flow path, will have full transmission capability on the network without impeding simultaneous transmission by the balance of the network.

As previously mentioned, FIG. 6B is a pictorial representation of a transmission scenario on a communication network while Table 2 is the corresponding table of calculations performed per the rate-based protocol in FIG. 4. While FIG. 6A presented a flow path scenario whereby data packet traffic cumulatively added through the network as multiple nodes tried to communicate to the same destination, FIG. 6B present a different scenario. FIG. 6B presents the scenario whereby local traffic exists on the network independently of any other traffic on the network. Flow path 603 is a local data packet flow path from the source node 3 to an adjacent destination node, 2, while flow path 601 is a local data packet flow path from source node 1 to destination node 4. In contrast, flow path 602 is not a local data packet flow path because it crosses several nodes before it arrives at its destination node one. Flow path 602 overlaps on flow path 603 and thus prevents the local flow path 603 from having 100% of the transmission capability for its local path.

Referring now to Table 2, shown below, the values of N1, N2, and N3 are computed in the same manner illustrated in the previous example. Likewise, values for T and U in columns CA and CB, are computed in the same manner illustrated in the previous example. Note that he U value for node 3 has a value greater than 1. This means that the system is a large amount of unused capacity, and that upstream nodes should have no restriction in their transmission with respect to the needs of node 2. However, the maximum transmission rate capability is 1, or 100%, hence the value of 2 is changed to a value of 1.

utilization, efficiency, and quality of service for the WAN and the LAN networks and the devices connected thereto.

Figure 7:
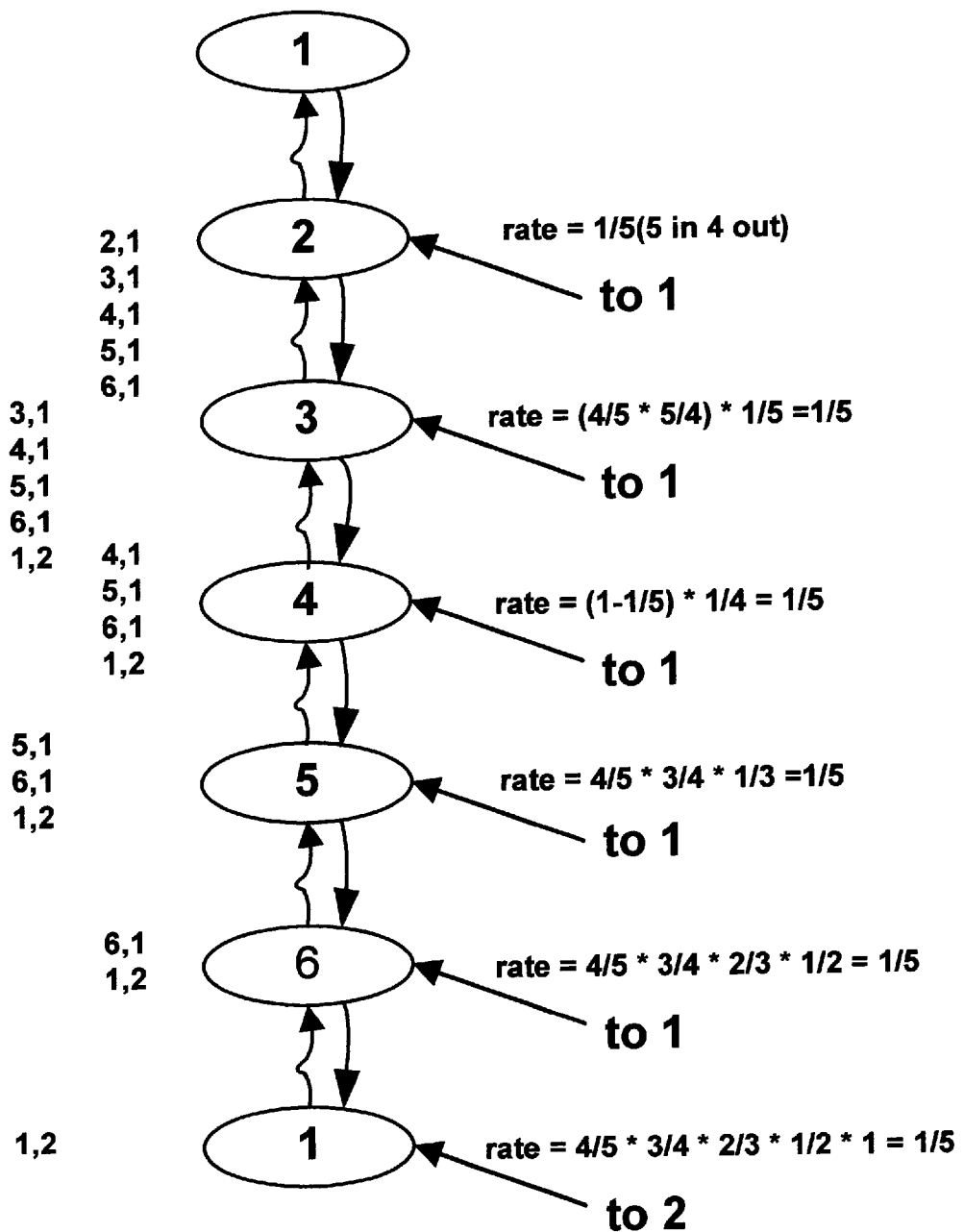
FIG. 7 is a pictorial representation of a second transmission scenario on a communication network in accordance with the present invention.

FIG. 7 presents a final transmission scenario using the present invention. The illustration in FIG. 7 is similar to those in FIGS. 6A and 6B, but with different nodes and different number of flows entering the network from different nodes. For example, FIG. 7 has 6 nodes instead of 4 nodes used in the previous figures. Likewise, the number of flows N3 into the network from the different nodes' tributaries is as follows: node 1 has one flow coming into network from the different nodes' tributaries is as follows: node 1 has one flow coming into the network going to node 2; node 6 has one flow coming into the network going to node 1; node 5 has one flow-coming into the network going to node 1; node 4 has one flow coming into the network going to node 1; node 3 has one flow coming into the network going to node 1; and node 2 has one flow coming into the network going to node 1. The rate calculated to the right of the nodes indicates the product of the transmission factors for all

TABLE 2

Application of Rate-Based Flow Control for Network Transmission Scenario in FIG. 6B.

| 1. Pick a node A | 2. Count Number of Flow(s) B | | | 3. Calculate nominal limits for each node C | | 4. Apply calculated limits to system D | |
|---|---|---|---|---|---|---|---|
| | | | | Calculate Nominal Tributary Limit (T) | Calculate Upstream transmission Factor (U) | List of all upstream transmission factors from all downstream nodes(U) | Net Tributary Limit T × Π(U) |
| Node | N1 | N2 | N3 | CA | CB | DA | DB |
| 1 | 1 | 0 | 1 | 1 | 1 | 1 | 1 |
| 2 | 1 | 1 | 0 | 0 | 2, use 1 | 1 | 0 |
| 3 | 0 | 1 | 1 | ½ | ½ | 1, 1 | ½ × (1) = ½ |
| 4 | 1 | 0 | 1 | 1 | 1 | 1, 1, ½ | 1 × (1 × 1 × ½) = ½ |

Similar to the previous example, the Net Tributary limit in column DB of Table 2 is calculated for this second scenario. Like the previous example, flow paths that overlap or conflict must share the communication network's transmission capability. Hence, the flow path 603 from node 3 must share the network with flow path 602 from node 2. Because there are only two flow paths on this side of the network, they each receive ½ of the transmission capability. In other words, they receive Xon/Xoff signals in ratios of ½. As a result both nodes have fair access to transmit on the network because the ratio of transmission vs. non-transmission is one-half. This time is generally allocated in the length of the data packet transmission. Thus, the node will transmit one packet then remain idle for a time equivalent to a data packet length while the other node transmits.

Still referring to FIG. 6B, note how flow path 601 from node 1 is unrestricted in its transmission to node 4. This lack of restriction is numerically indicated by the "1" value in column DB for node 1. The "1" implies that this flow path has 100% transmission access to the network. Indeed, while flow paths 602 and 603 are sharing their portion of the network, flow path 601 can operate without interference. Hence, the present invention overcomes a major limitation of the prior art by effectively freeing up the network to allow local traffic on areas of the network that are not being used by other nodes. This improvement allows improved system upstream nodes times each other and times the nominal tributary limit. As the results indicate, the present invention provides a method whereby the rate of each tributary is, over a period of time, equally distributed. Hence, the "⅕" net tributary limit for each tributary apportions the systems limited resources in an equitable fashion.

The three transmission scenarios presented herein assume the network has full-duplex (FDX) transmission. With FDX, a node has capability for simultaneously transmission in two directions, such as sending in one direction while receiving from another direction as shown in nodes one and four. However, while the present embodiment envisions FDX transmission, the present invention is well-suited for use on a communication network with half-duplex transmission capability. Although the half-duplex system will share the system resources for overlapping flow paths as the present invention embodies, it will not have the ability to utilize the local traffic feature like the full-duplex system.

In conclusion, the present invention provides a communication network system and a method for transmission on the communication network that has a high transmission-rate at a low cost. The present invention also provides a transmission protocol and architecture that does not require complex and computationally-intensive translation from the existing LAN protocols to other protocols used on interconnecting communication networks such as a WAN. Additionally, the present invention provides for a network transmission protocol and architecture that has flexibility to adjust its transmission capabilities to high and low data traffic conditions between networks and between local nodes. Furthermore, the present invention provides a network transmission protocol that has the flexibility to operate on different types of physical layer such as fiber or cable. Lastly, the present invention provides a protocol to regulate traffic in a manner that ensures fairness in the amount of data transmitted between different nodes onto the network.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order best to explain the principles of the invention and its practical application, to thereby enable others skilled in the art best to utilize the invention and various embodiments with various modifications as are suited to the particular use contemplated. It is intended that the scope of the invention be defined by the Claims appended hereto and their equivalents.

What is claimed is:

1. In a ring-topology communication network communicatively coupling a plurality of network nodes each representing a local area network (LAN), a method for controlling a transmission of a plurality of data packets on said ring-topology communication network using ethernet packet format and equipment, said method comprising the computer implemented steps of:

a) determining a flow path for each of said plurality of data packets in said communication network;

b) calculating a data transmission rate limit for each of a plurality of flow paths through each of said plurality of network nodes onto said communication network, said limit based upon said flow path of each of said plurality of data packets, wherein said data packets have controlled access to transmit on said communication network, said plurality of limits provided to equitably share transmission resources;

c) adaptively adjusting said data transmission limit for each of said plurality of flow paths depending upon traffic conditions in each of said plurality of network nodes;

d) controlling said transmission of said data packets on said flow paths according to said limits respectively calculated for said data packets;

e) dividing a bandwidth of a channel immediately downstream of said network node by said net tributary flow limit; and f) multiplexing said data packets flowing from upstream of said node with data packets flowing from said tributary of said node in a ratio equal to said net tributary flow limit.

2. The method as described in claim 1 further comprising the steps of:

reading a source and a destination address for a plurality of data packets queued to be transmitted on said communication network; and counting a number of packet flows queued to travel through each of a plurality of flow paths through each of a plurality of network nodes within said communication network.

3. The method as described in claim 2 further comprising the steps of:

counting a number of flows paths for data packets queued to travel through each of a plurality of flow paths through each of a plurality of network nodes within said communication network, said flow paths comprising an upstream-to-tributary flow path wherein said data packet travels from said ring network immediately upstream of said network node through said network node and out of said ring network via a tributary that is connected to only said network node, an upstream-to-downstream flow path wherein said data packet travels from said ring network immediately upstream of said network node to immediately downstream of said network node, bypassing said tributary, and a tributary-to-downstream flow path wherein said data packet travels from said tributary into said network node and immediately downstream into said ring network.

4. The method as described in claim 1, said method further comprising the step of:

repeating said steps a) through c) in order to update said flow limits when any of said network nodes sees one of said data packets sourced from a same node on said communication network within a time since said steps a) through c) were previously performed.

5. The method as described in claim 1, said method further comprising the step of:

calculating said plurality of limits for said flow paths of said data packets with respect to each of said network nodes such that a local transmission of said data packets is not impeded by a transmission of data packets on areas of the network other than said local transmission.

6. The method as described in claim 1, said method further comprising the step of:

calculating said plurality of limits for said flow paths of said data packets with respect to each of said network nodes such that data packets have an equitable transmission rate in a case where said flow paths of data packets overlap on said communication network.

7. The method as described in claim 1, further comprising the step of:

time-vision multiplexing said data packets flowing from upstream of said node with data packets flowing from said tributary of said node to said communication network in a ratio equal to said tributary flow limit.

8. The method as described in claim 1, further comprising the step of:

wave-division multiplexing said data packets flowing from upstream of said node with data packets flowing from said tributary of said node to said communication network in a ratio equal to said tributary flow limit.

9. The method as described in claim 1, further comprising the step of:

pulse-division multiplexing said data packets flowing from upstream of said node with data packets flowing from said tributary of said node to said communication network in a ratio equal to said tributary flow limit.

10. The method as described in claim 1, wherein said data-packets have a fixed length of data that is regulated by said flow limits.

11. The method as described in claim 1, wherein said data-packets have a variable length of data regulated by and proportional to said flow limits.

12. The method as described in claim 1, further comprising the step of:

wave-division multiplexing said data packets flowing from upstream of said node with data packets flowing from said tributary of said node to said communication network in a ratio equal to said tributary flow limit, said wave-division multiplexing occurring on a fraction of a quantity of transmission channels, with a balance of said transmission channels utilizing a different protocol to transmit.

13. In a ring-topology communication network communicatively coupling a plurality of network nodes each representing a local area network (LAN), a method for controlling a transmission of a plurality of data packets on said ring-topology communication network using ethernet packet format and equipment, said method comprising the computer implemented steps of:

a) determining a flow path for each of said plurality of data packets in said communication network;

b) calculating a data transmission rate limit for each of a plurality of flow paths through each of said plurality of network nodes onto said communication network, said limit based upon said flow path of each of said plurality of data packets, wherein said data packets have controlled access to transmit on said communication network, said plurality of limits provided to equitably share transmission resources;

c) adaptively adjusting said data transmission limit for each of said plurality of flow paths depending upon traffic conditions in each of said plurality of network nodes;

d) controlling said transmission of said data packets on said flow paths according to said limits respectively calculated for said data packets;

e) calculating a nominal tributary transmission limit for said node by dividing a quantity of said flow paths from said tributary-to-downstream with the sum of the quantity of said flow paths from said tributary-to-downstream and the quantity of said flow paths from upstream-to-downstream;

f) calculating an upstream transmission factor for all nodes upstream of said node by dividing a sum of the quantity of said flow paths from said upstream-to-tributary and the quantity of said flow paths from said upstream-to-downstream with the sum of the quantity of said flow paths from said tributary-to-downstream and the quantity of said flow paths form said upstream-to-downstream; and g) calculating a net tributary transmission limit by picking a first node on the network, setting the net tributary transmission rate of said first node equal to said nominal tributary flow rate of said first node, and iteratively setting the net tributary transmission rate for each of said plurality of nodes located upstream of said first node equal to the product of the nominal tributary transmission rate for each of said plurality of nodes times all said upstream transmission factors calculated for all of said plurality of nodes located downstream of each of said plurality of nodes.

14. In a ring-topology communication network communicatively coupling a plurality of network nodes each representing a local area network (LAN), a method for controlling a transmission of a plurality of data packets on said ring-topology communication network using ethernet packet format and equipment, said method comprising the computer implemented steps of:

a) determining a flow path for each of said plurality of data packets in said communication network;

b) calculating a data transmission rate limit for each of a plurality of flow paths through each of said plurality of network nodes onto said communication network, said limit based upon said flow path of each of said plurality of data packets, wherein said data packets have controlled access to transmit on said communication network, said plurality of limits provided to equitably share transmission resources;

c) adaptively adjusting said data transmission limit for each of said plurality of flow paths depending upon traffic conditions in each of said plurality of network nodes;

d) controlling said transmission of said data packets on said flow paths according to said limits respectively calculated for said data packets;

e) dividing a bandwidth of a channel immediately downstream of said network node by said net tributary flow limit;

f) sending Xon and Xoff signals to a plurality of upstream nodes to regulate the transmission of said data packets from said tributaries onto said communication network; and g) multiplexing said data packets flowing from upstream of said node with data packets flowing from said tributary of said node in a ratio equal to said tributary flow limit.

* * * * *